(12) United States Patent
Berger et al.

(10) Patent No.: US 10,749,146 B2
(45) Date of Patent: Aug. 18, 2020

(54) THERMAL COMPOSITE

(71) Applicant: GM GLOBAL TECHNOLOGY OPERATIONS LLC, Detroit, MI (US)

(72) Inventors: Elisabeth J. Berger, Farmington Hills, MI (US); Kestutis A. Sonta, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 373 days.

(21) Appl. No.: 15/392,347

(22) Filed: Dec. 28, 2016

(65) Prior Publication Data

US 2017/0365824 A1 Dec. 21, 2017

Related U.S. Application Data

(60) Provisional application No. 62/350,980, filed on Jun. 16, 2016.

(51) Int. Cl.
*H01M 2/02* (2006.01)
*B32B 7/12* (2006.01)
*B32B 15/04* (2006.01)
*B32B 5/02* (2006.01)
*H01M 2/10* (2006.01)
*B32B 19/04* (2006.01)
*B32B 15/14* (2006.01)
(Continued)

(52) U.S. Cl.
CPC .......... *H01M 2/0202* (2013.01); *B32B 5/024* (2013.01); *B32B 7/12* (2013.01); *B32B 15/04* (2013.01); *B32B 15/14* (2013.01); *B32B 15/20* (2013.01); *B32B 19/041* (2013.01); *B32B 19/045* (2013.01); *B32B 27/12* (2013.01); *H01M 2/0287* (2013.01); *H01M 2/1016* (2013.01); *H01M 2/1094* (2013.01); *B32B 2250/03* (2013.01); *B32B 2262/101* (2013.01); *B32B 2270/00* (2013.01); *B32B 2307/206* (2013.01); *B32B 2307/212* (2013.01); *B32B 2307/304* (2013.01); *B32B 2307/3065* (2013.01); *B32B 2457/10* (2013.01); *B32B 2571/00* (2013.01)

(58) Field of Classification Search
CPC ..... B32B 15/04; B32B 7/12; B32B 2262/101; B32B 2307/3065
See application file for complete search history.

(56) References Cited

U.S. PATENT DOCUMENTS

| 4,579,882 | A | * | 4/1986 | Kanbe | ...................... | H01B 1/22 |
| | | | | | | 252/513 |
| 4,581,393 | A | * | 4/1986 | Fortier | ..................... | C08K 7/14 |
| | | | | | | 523/214 |

(Continued)

OTHER PUBLICATIONS

Textile Technologies, "AF2000/270LA Technical Datasheet", 1 page.

(Continued)

*Primary Examiner* — Jeremy R Pierce
(74) *Attorney, Agent, or Firm* — Harness, Dickey & Pierce, P.L.C.

(57) ABSTRACT

An example of a thermal composite includes a substrate, a primer layer, a first adhesive layer, a blanket layer, a second adhesive layer, and a metal layer. The blanket layer includes basalt fibers or glass fibers. The thermal composite may be incorporated into a battery pack as a battery enclosure.

20 Claims, 1 Drawing Sheet

(51) Int. Cl.
 *B32B 15/20* (2006.01)
 *B32B 27/12* (2006.01)

(56) References Cited

U.S. PATENT DOCUMENTS

| | | | |
|---|---|---|---|
| 5,100,724 A | 3/1992 | LaMarca, II et al. | |
| 5,403,419 A * | 4/1995 | Yoshikawa | B32B 15/06 156/151 |
| 5,654,063 A * | 8/1997 | Kirk | A62C 2/065 428/319.1 |
| 6,410,137 B1 * | 6/2002 | Bunyan | C08K 5/06 428/356 |
| 7,767,597 B2 | 8/2010 | Garvey | |
| 7,819,462 B1 | 10/2010 | Owens | |
| 7,878,301 B2 | 2/2011 | Gross et al. | |
| 8,033,592 B2 | 10/2011 | Hsu et al. | |
| 8,109,492 B2 | 2/2012 | Winocur | |
| 8,961,724 B2 | 2/2015 | Polewarczyk et al. | |
| 9,227,673 B2 | 1/2016 | Berger et al. | |
| 2006/0110599 A1 * | 5/2006 | Honma | B32B 5/10 428/413 |
| 2007/0110942 A1 * | 5/2007 | Shah | B32B 5/22 428/354 |
| 2008/0001128 A1 | 1/2008 | Goldberg | |
| 2008/0166937 A1 * | 7/2008 | Garvey | B32B 27/10 442/1 |
| 2010/0151239 A1 * | 6/2010 | Hebert | B32B 7/12 428/351 |
| 2011/0136401 A1 | 6/2011 | Hanusa et al. | |
| 2012/0100414 A1 * | 4/2012 | Sonta | H01M 2/1072 429/163 |
| 2016/0264082 A1 | 9/2016 | Berger et al. | |

OTHER PUBLICATIONS

PPG Fiber Glass, "G75 (EC9 68) Single End Yarn". 2 pages (2016).
Owens Corning, "Multiaxial Non-Crimp Fabric (NCF) Reinforcements", 6 pages (Feb. 2014).

* cited by examiner

THERMAL COMPOSITE

CROSS-REFERENCE TO RELATED APPLICATIONS

This application claims the benefit of U.S. Provisional Application Ser. No. 62/350,980, filed Jun. 16, 2016, which is incorporated by reference herein in its entirety.

INTRODUCTION

Thermal composites may be fire resistant. Fire resistant thermal composites may be useful both in stationary systems and in mobile systems, such as aircraft, water vessels, trains, vehicles, and buses. For example, fire resistant thermal composites may be useful in automotive applications, construction applications, consumer electronics applications, and power tools applications. As specific examples, fire resistant thermal composites may be used in battery enclosures and engine compartments.

SUMMARY

An example of a thermal composite includes a substrate, a primer layer, a first adhesive layer, a blanket layer, a second adhesive layer, and a metal foil layer. The blanket layer includes basalt fibers or glass fibers. The thermal composite may be incorporated into a battery pack as a battery enclosure.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
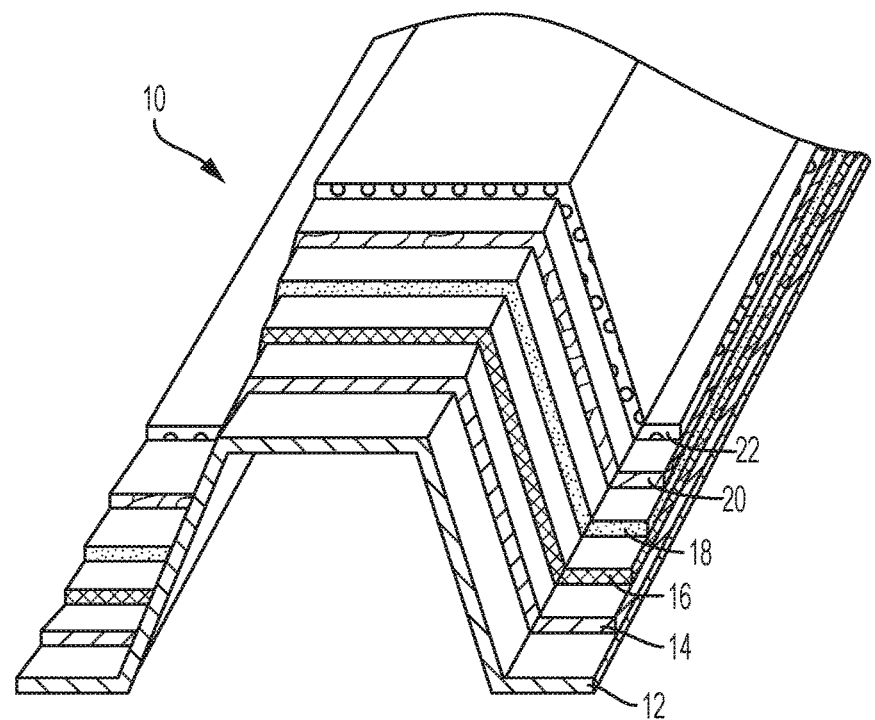
FIG. 1 is a schematic view of an example of a thermal composite disclosed herein.

Examples of the thermal composite disclosed herein utilize a series of layers that allows the thermal composite to achieve the desired thermal reflectivity and fire resistance. The series of layers includes a blanket layer positioned between a substrate and a metal foil layer. The blanket layer is formed of basalt or glass fibers, and is adhered to the substrate and the metal foil layer with a high temperature adhesive. The metal foil layer defines an external surface to be exposed to a flame. The flame, for example a test flame, is produced in an external space with at least a portion of the external space defined by the external surface of the thermal composite. The substrate defines an internal surface distal to the external surface. The internal surface faces an internal space to be protected by the thermal composite. When the thermal composite is exposed to the flame (e.g., at the metal foil layer), the adhesive may out-gas combustible gases. However, the heat/burn resistance, anti-oxidation, and flame arresting properties of the blanket layer enable the blanket layer to provide a consistent air gap or consistent insulation between the flame and the underlying substrate. This air gap/insulation aids in the flame rapidly self-extinguishing (e.g., in 2 minutes or less), and thus protects the substrate from pyrolization, outgassing, and burning.

Glass fibers melt between 850° C. and 1050° C. The weave of the blanket layer made from glass fibers remains intact until the glass fibers begin to flow. The blanket layer is an insulating layer and a flame arrestor. The insulating property and flame arresting property of the blanket layer remain when the weave is intact. Further, flames do not penetrate the blanket layer when the weave is intact. Basalt fibers melt at about 1400° C., which is even higher than the melting point of glass fibers. Additionally, basalt fibers have a stronger specific strength and specific modulus compared to glass fibers. (See Table 1 below.) Therefore, a blanket layer made from basalt fibers could be lighter than a blanket layer made from glass fiber of similar strength. Overall, the thermal composite may provide protection against convective heat soaks, radiant heat sources, and reflective heat sources.

The thermal composite may be used in any application where it is desirable to improve the thermal performance. As used herein, thermal performance means the ability of a composite to insulate an internal space from the heat of an external flame, and penetration by an external flame for an interval of time. The thermal composite 10 may be incorporated into battery enclosures and/or engine compartments in stationary systems and/or in mobile systems, such as aircraft, water vessels, trains, vehicles, and buses. For example, the thermal composite may be formed into a battery enclosure that, in combination with a base tray fully covers a battery pack used in a vehicle, a manufacturing facility, a residence, a traffic or pedestrian crossing light, etc. For another example, the thermal composite may be formed into an electrical enclosure, equipment enclosure, or instrumentation enclosure for the automotive industry, the aviation industry, the aerospace industry, the telecommunications industry, the transportation industry, the housing industry, etc. Still further, the thermal composite may be used in other automotive applications, construction applications, consumer electronics applications, and/or power tools applications. Some examples of applications for the thermal composite of the present disclosure include: wiring conduit, wiring trays, electrical power distribution boxes, engine bays, fuel tanks, fuel lines, ordinance covers, energetic material magazines, armor, engine nacelles, engine compartments, and aircraft cargo containers.

Referring now to FIG. 1, an example of the thermal composite 10 of the present disclosure is depicted. The thermal composite 10 includes a substrate 12, a primer layer 14, a first adhesive layer 16, a blanket layer 18, a second adhesive layer 20, and a metal foil layer 22.

In the example shown in FIG. 1, thermal composite 10 has a convex shape. It is to be understood that the thermal composite 10 may have any shape, depending, in part upon the application in which the thermal composite 10 is to be used. As one example, the thermal composite 10 may be shaped to completely encapsulate or surround the component(s) to be contained therein. As another example, the thermal composite 10 may be shaped to be placed over the component(s) to be protected thereby. For example, the thermal composite 10 may be a cover placed over a component on a tray or platform. In yet another example, the thermal composite 10 may form a vertical wall in a building. For example, the thermal composite 10 may form the walls of an internal combustion engine dynamometer laboratory.

The substrate 12 may be any electrically non-conductive material. In an example, the substrate 12 is a battery pack cover. When used as the battery pack cover, the substrate 12 may be a non-conductive, solid, polymeric composite material that covers the battery and electronics contained within the battery pack. An example of the substrate 12 is a polyester/vinyl ester blend. More specifically, the substrate 12 may be a blend of polyester and a vinyl ester thermosetting resin with calcium carbonate and aluminum trihydrate mineral fillers and glass reinforcement. The thickness of the substrate 12 may vary depending upon the application. In an example, the substrate thickness ranges from about 2 mm to about 6 mm. In another example, the substrate thickness ranges from about 3.5 mm to about 4 mm. In still another example, the substrate thickness is about 3.8 mm. While several example thicknesses have been provided, it is to be understood that thicker or thinner substrates may be used, depending upon the application.

The primer layer 14 improves adhesion of the adhesive to the substrate 12. The primer layer 14 may also serves as an electromagnetic interference shielding (EMI) layer. In an example, the primer layer 14 includes an epoxide layer with fine nickel platelets dispersed throughout the matrix. The nickel provides electromagnetic interference shielding for the assembly.

In an example, the primer layer 14 is painted on a surface of the substrate 12 that receives the remainder of the thermal composite components.

The first adhesive layer 16 and/or the second adhesive layer 20 may bond or affix one or more layer(s) of the thermal composite 10 to one or more other layer(s) of the thermal composite 10. For example, the first adhesive layer 16 may bond or affix the blanket layer 18 to the substrate 12. The bond between the adhesive layer 16 and the substrate 12 may be made stronger and longer lasting by including the primer layer 14 between the adhesive layer 16 and the substrate 12. The second adhesive layer 20 may similarly bond or affix the metal foil layer 22 to the blanket layer 18.

The first adhesive layer 16 and the second adhesive layer 20 may include any flame retardant adhesive. In some examples, flame retardants may also be included in the primer layer 14 and/or the substrate 12. It is to be understood that the first adhesive layer 16 and the second adhesive layer 20 may be the same adhesive(s) or different adhesive(s). In an example, the first adhesive layer 16 and/or the second adhesive layer 20 is a flame retardant doped acrylic adhesive. The acrylic adhesive may be selected from the group consisting of homopolymers and copolymers of acrylic acid, methacrylic acid, isooctyl acrylate, acrylamide, methacrylamide, acrylonitrile, methacrylonitrile, methyl isoamyl acrylate and 2-ethyl hexylacrylate. The flame retardant dopants added to the acrylic adhesive may include inorganic based additives, halogenated based additives, nitrogen based additives, and phosphorous based additives. As examples, the flame retardant dopants may be cyclic phosphonate esters, ammonium polyphosphate, or the like.

The flame retardants may be added to the acrylic adhesive and then mixed at high sheer to disperse the flame retardant. The flame retardants may be dispersed at a 10% to 15% letdown ratio.

The blanket layer 18 includes basalt fibers or glass fibers, such as E-glass fibers. Basalt fibers and E-glass fibers have properties that render them suitable for being used in a variety of applications. Some of these properties are shown in Table 1.

TABLE 1

| Fiber | Density (g/cm$^3$) | Specific Strength | Specific Modulus | Melting Point (° C.) |
|---|---|---|---|---|
| E-glass | 2.60 | 1.33 | 29.2 | 850-1050 |
| Basalt | 2.65 | 1.57-1.81 | 37.7-41.5 | 1400 |

The low density and specific strength of the fibers makes them suitable for use in applications where light weight and structural integrity are desirable (e.g., battery enclosures, aerospace applications, etc.). The high specific modulus of the fibers makes them suitable for use in applications where minimum structural weight is desirable (e.g., automotive, aerospace, etc.). Moreover, the high melting point of the fibers makes them suitable for use in applications where they may be exposed to high temperatures.

As used herein, the word "filament" means a single fiber. A single continuous filament that may be rolled on a spool is a "monofilament" as used herein. Filaments in a bunch are called a "strand" or an "end." If the filaments are all parallel to each other, the "end" is called a "roving". If the filaments are twisted to hold the fibers together, the bundle is called a "yarn."

Either roving or yarn can be woven into a fabric. If roving is used, the fabric is called "woven roving;" if yarn is used, the fabric is called "cloth." Although the terms "yarn" and "roving" are not interchangeable, where the word "yarn" is applied in this document, it is to be understood that "roving" may be applied also. Nonwoven fabric is a fabric-like material such as "felt" made from long fibers, bonded together by chemical treatment, mechanical treatment, heat treatment, or solvent treatment. Nonwoven fabric can also be stitched together with parallel fibers which are stitch-bonded together using a high elongation thread, such as polyamide thread. Stitch-bonded fabric can contain one or more layers of parallel fibers, with the layers being at angles to each other, such as 0°/90° or 0°/45°/90°/−45°. This stitch-bonded fabric is also referred to as non-crimp fabric, as the fibers are not woven over and under each other, causing bends or crimps.

In a roll of fabric, "warp yarns" run in the direction of the roll and are continuous for the entire length of the roll. "Fill yarns" run crosswise to the roll direction. Warp yarns are usually called "ends" and fill yarns "picks." (The terms apply equally to rovings, but yarn will be used in the rest of the discussion for simplicity.)

Fabric count refers to the number of warp yarns (ends) and fill yarns (picks) per inch. For example, a 24×22 fabric has 24 ends in every inch of fill direction and 22 picks in every inch of warp direction. Note that warp yarns are counted in the fill direction, and fill yarns are counted in the warp direction.

If the end and pick counts are roughly equal, the fabric is considered "bidirectional" (BID). If the pick count is very small, most of the yarns run in the warp direction, and the fabric is nearly unidirectional. Some unidirectional cloths have no fill yarns; instead, the warp yarns are held together by a thin stream of glue. "Unidirectional prepreg" relies on resin to hold the fibers together. "Weave" describes how the warp and fill yarns are interlaced. Examples of weaves are "plain," "twill," "harness satin," and "crow-foot satin." Weave determines drape ability and isotropy of strength.

Both the basalt fibers and the glass fibers can be manu-factured into a configuration that is suitable for the blanket layer 18. Several fibers may be bunched together so that they are all parallel to each other, and this is referred to as a roving. In an example, the rovings of basalt fibers or the glass fibers may be woven together to form a woven sheet, such as a 2×2 Twill weave fabric (i.e., a 2×2 woven twill). The basalt or glass fiber rovings may also be in the form of a multiaxial non-crimp fabric, unidirectionally stitched fibers, a needle-punched fiber mat, or a combination thereof. It may be desirable to use a thinner blanket layer 18 in order to reduce the mass of the overall thermal composite 10, as long as the thermal performance of the blanket layer 18 is not deleteriously affected.

The metal foil layer 22 reflects heat from radiant heat sources, and reflective heat sources. For example, if the thermal composite 10 is installed as a heat shield on the underside of a vehicle, the metal foil layer 22 of the thermal composite 10 may reflect infra-red energy from a hot exhaust system element, or from hot pavement. The metal foil layer 22 may also reflect at least a portion of the radiant energy of a flame, for example a test flame. The metal foil layer 22 may be formed of any metal foil. Examples of metal foils that may form the metal foil layer 22 include aluminum foil. In an example, 0.025 mm aluminum foil is used. The metal foil layer 22 may have a thickness ranging from about 0.01 mm to about 0.1 mm, although the thickness may be varied, e.g., when the metal foil is laminated to a cloth (discussed below). In an example, the metal foil layer 22 may have a thickness ranging from about 0.02 mm to 0.03 mm. The metal foil is a light weight barrier and thus may reduce the weight of the overall thermal composite 10. In some instances (e.g., when increased mass is not of concern), the metal foil layer 22 may be replaced with another metal layer, such as a piece of sheet metal.

The metal foil included in the metal foil layer 22 may be laminated to a cloth. For example, aluminum foil may be laminated with an adhesive film to a woven fabric. As a more specific example, a 0.018 mm thick aluminum foil may be laminated with a high temperature (HT) adhesive film to a woven E-glass fabric with an overall thickness of 0.22 mm. The E-glass fabric may be a plain weave of EC9-68 yarn with a warp thread count of about 44 per inch and a weft thread count of about 30.5 per inch, although it is to be understood that other E-glass fabrics may be used.

In an example, the primer layer 14 is disposed between the substrate 12 and the first adhesive layer 16, the first adhesive layer 16 is disposed between the primer layer 14 and the blanket layer 18, the blanket layer 18 is disposed between the first adhesive layer 16 and the second adhesive layer 20, and the second adhesive layer 20 is disposed between the blanket layer 18 and the metal foil layer 22.

It is to be understood that the thermal composite 10 may include additional layers, which may be placed in contact with any of the substrate 12, the primer layer 14, the first adhesive layer 16, the blanket layer 18, the second adhesive layer 20, or the metal foil layer 22.

It is further to be understood that within the thermal composite 10, each layer may cover all or part of an immediately adjacent layer. For example, the adhesive may be applied in spots that cover about 10 percent of the faying surfaces of adjacent layers.

In an example of a method for making the thermal composite 10, the second adhesive 20 may be film coated on the metal foil layer 22. The blanket layer 18 may be laminated onto the second adhesive 20 coated foil layer 22. The first adhesive layer 16 may then be roll coated on the blanket layer 18. This material may then be die cut into suitable patterns and laminated onto the primer layer 14 (which may be painted on the surface of the substrate 12).

All of the layers may be pressed together and the adhesive layers 16, 20 may be allowed to cure.

As mentioned above, the thermal composite 10 provides protection against convective heat soaks, radiant heat sources, and reflective heat sources. The thermal composite 10 also has some thermal insulating capability. Moreover, the thermal composite 10 may also be used as a structural composite.

If any component of the thermal composite 10 ignites after exposure to an external flame, for example an external test flame, the portion of the thermal composite 10 that has ignited will self-extinguish within 2 minutes of the removal of the test flame. In an example, when the thermal composite 10 is exposed to an external flame, the metal foil layer 22 may melt or rupture, and the second adhesive layer 20 may out-gas. As used herein, to out-gas means to produce a gas as a result of a process. For example, the second adhesive layer 20 may produce a combustible gas when heated to a high temperature, for example by an external test flame. However, the out-gassing of the adhesive layer 20 disclosed herein may also produce non-combustible (e.g., nitrogen gas) and/or fire-retardant products, which contribute to the self-extinguishing properties of the thermal composite 10. The blanket layer 18, however, is not combustible, and acts as a barrier to the heat of the external flame, keeping the first (inner) adhesive layer 16 and the primer layer 14 from reaching the combustion temperature, and thus acting to "self extinguish" the fire in the thermal composite 10. In an example, the thermal composite 10 may self-extinguish within 2 minute of fire source removal. As used herein, "self-extinguish" means that a flame ceases to exist on any part of the thermal composite 10; and no new material is presented to the flame (e.g. water, carbon dioxide, sodium bicarbonate, halon, etc.) to cause the existence of the flame to end. In some instances, "self-extinguish" may also mean that there is no flameless burning, combustion, or smoldering. As used herein, "new material" means material that is not present as a part of the thermal composite 10 before the flame ignited. For example, a fire retardant chemical mixed into the adhesive before the adhesive is applied to laminate layers of the thermal composite 10 is not a "new material". $CO_2$ from a fire extinguisher is an example of new material. Smothering the flame with a laboratory fire blanket is an example of presenting a new material to the flame.

The thermal composite 10 may weigh less than comparative thermal composites due in part, for example, the efficiency of the fire retardant capability of the blanket layer 18 and to the light weight of the metal foil layer 22. The reduced weight of the thermal composite 10, as compared to comparative thermal composites, may allow a mobile system, such as an aircraft, water vessel, train, vehicle, or bus that has incorporated the thermal composite 10 therein to operate with better energy efficiency.

Figure 2:
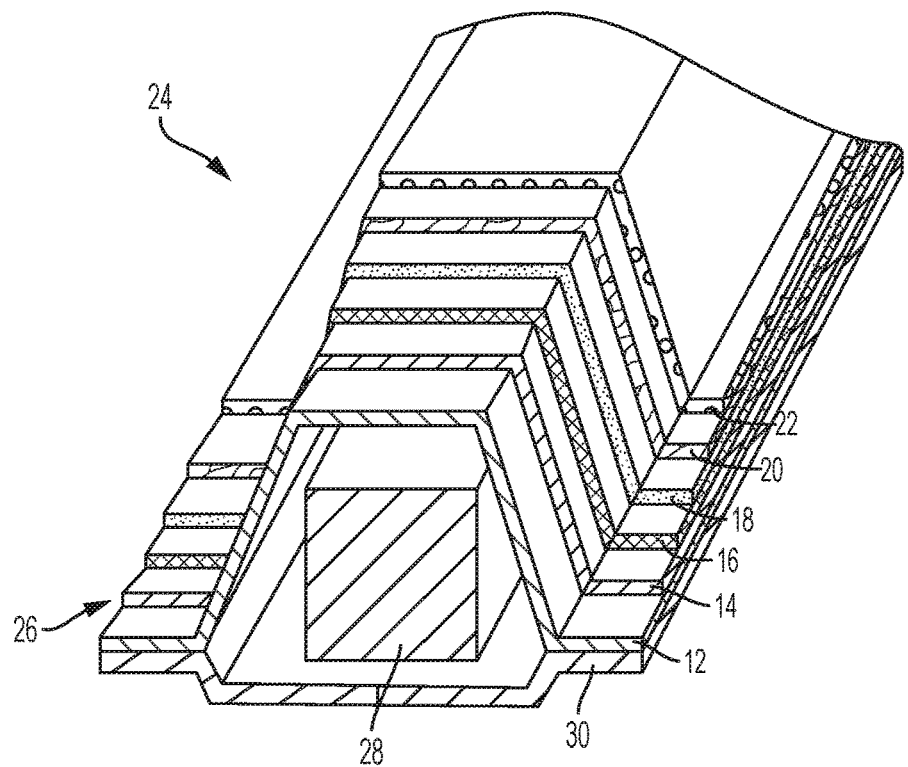
FIG. 2 is a schematic view of an example of a battery pack disclosed herein.

As mentioned above, the thermal composite 10 may be incorporated into a battery pack as a battery enclosure. FIG. 2 illustrates an example of a battery pack 24 including the thermal composite 10 as a battery enclosure 26. The battery pack 24 shown in FIG. 2 includes, in addition to the battery enclosure 26, a voltaic battery 28 and a base tray 30 (i.e., a close-out lower panel). The base tray 30 may have flanges mated to the battery enclosure 26. The base tray 30 may be the same stack of materials as the battery enclosure 26 or may be another material, such as structural aluminum or steel.

The voltaic battery 28 may be any voltaic battery. In an example, the voltaic battery 28 has a voltage ranging from about 60 volts direct current (DC) to about 1,500 volts DC.

The battery enclosure 26 may include additional electronics, for example a voltage regulator or a power inverter to convert direct current to alternating current.

The battery enclosure 26, like the thermal composite 10, includes the substrate 12, the primer layer 14, the first adhesive layer 16, the blanket layer 18, the second adhesive layer 20, and the metal foil layer 22. The battery enclosure 26 may include any component and/or characteristic of the thermal composite 10. It is to be understood that references to the thermal composite 10 and the battery enclosure 26 are interchangeable except as specifically stated herein.

The battery enclosure 26 may partially encapsulate the voltaic battery 28. The battery pack 24 also includes the base tray 30, which forms a complete enclosure around the voltaic battery when used with the battery enclosure 26.

In an example of the battery enclosure 26, the substrate 12 is disposed between the voltaic battery 28 and the primer layer 14, the primer layer 14 is disposed between the substrate 12 and the first adhesive layer 16, the first adhesive layer 16 is disposed between the primer layer 14 and the blanket layer 18, the blanket layer 18 is disposed between the first adhesive layer 16 and the second adhesive layer 20, and the second adhesive layer 20 is disposed between the blanket layer 18 and the metal foil layer 22. The substrate 12 covers, but is not in direct contact with the voltaic battery 28. In some instances, the substrate 12 (and the layers adhered thereto) may be configured to be placed over the voltaic battery 28 and joined to another piece to form a complete enclosure. As an example, the thermal composite 10 structure may be joined to a metal base (e.g., base tray 30). In other instances, the substrate 12 (and the layers adhered thereto) may be configured to make up every section of a complete enclosure for the voltaic battery 28 (i.e., the thermal composite 10 is a container for the voltaic battery 28).

As mentioned above (in reference to the thermal composite 10), the battery enclosure 26 provides protection against convective heat soaks, radiant heat sources, and reflective heat sources. When the thermal composite 10 is incorporated into the battery pack 24 as a battery enclosure 26, this protection is provided to the voltaic battery 28.

As also mentioned above (in reference to the thermal composite 10), the battery enclosure 26 may also self-extinguish a flame that is fueled by the thermal composite 10 on a surface of the thermal composite 10 distal to the substrate 12. When the thermal composite 10 is incorporated into the battery pack 24 as a battery enclosure 26, the battery enclosure 26 may be disposed between the voltaic battery 28 and the external flame, e.g., the test flame or another flame. In an example, when the battery pack 24 is exposed to an external flame, the metal foil layer 22 may melt or rupture, and the second (outer) adhesive layer 20 may out-gas. The out-gases from the second adhesive layer 20 may be combustible. The blanket layer 18, however, is not combustible, and acts as a barrier to the heat of the external flame, keeping the first (inner) adhesive layer 16 and the primer layer 14 from reaching the combustion temperature, and thus acting to "self extinguish" the fire in the battery enclosure 26 The voltaic battery 28 is protected from the external flame and does not experience any explosion phenomenon. In an example, the battery enclosure 26 may self-extinguish within 2 minutes of the removal of the external fire source.

To further illustrate the present disclosure, examples are given herein. It is to be understood that these examples are provided for illustrative purposes and are not to be construed as limiting the scope of the disclosure.

EXAMPLES

Example 1

An example of the thermal composite was prepared. The example thermal composite included the primer layer applied on the substrate, the first adhesive layer applied on the primer layer, the blanket layer applied on the first adhesive layer, the second adhesive layer applied on the blanket layer, and the metal foil layer applied on the second adhesive layer. The substrate was 50% glass reinforced vinyl ester-polyester blend resin with calcium carbonate and aluminum trihydrate sheet molding compound (SMC). The primer layer was an epoxide paint with suspended nickel platelets with let down with a 5% non-halogenated flame retardant. The first adhesive layer and the second adhesive layer were a high temperature acrylic adhesive film. The blanket layer was basalt fiber (woven basalt fibers) woven in a 2×2 twill pattern. The metal foil layer was 0.025 mm aluminum foil.

A comparative example of the thermal composite was also prepared. The comparative example thermal composite included the primer layer applied on the substrate, the adhesive layer applied on the primer layer, and the metal foil layer applied on the adhesive layer. The substrate was sheet molding compound (SMC) as described above. The primer layer was identical to the example thermal composite. The adhesive layer was identical to the example thermal composite. The metal foil layer was 0.025 mm aluminum foil. The comparative example did not include the blanket layer.

The example and comparative example thermal composites were placed vertically and were exposed to a flame from a natural gas burner held sideways so that the flame was perpendicular to the example thermal composite and the comparative example thermal composite. The example thermal composite and the comparative example thermal composite were each heated by the flame to a maximum surface temperature of about 1250° F. The flame was extinguished after two minutes of exposure. The time for the samples to self-extinguish was recorded.

As a result of the gas flame burn test described above, the substrate of the comparative example was damaged and the substrate of the example was intact. More particularly, the substrate of the comparative example outgassed, and as a result, the metal foil ruptured. After the metal foil ruptured, the substrate of the comparative example was pyrollized and continued to burn for several minutes. In the example, the metal foil layer ruptured due to the outgassing of the second adhesive layer. However, after the gases burned, the out-gas fueled flame self-extinguished in less than one minute. The basalt blanket layer, the primer layer, and the substrate were intact. At most, a discoloration of the primer layer was observed.

Example 2

A regulatory test for lithium-ion traction battery packs includes an external bonfire test (GB/T 31467.3-2015, § 7.10).

The thermal composite disclosed herein was tested in a manner similar to this regulatory test. In particular, an example of the battery pack, including the voltaic battery and the thermal composite as the battery enclosure, was prepared. The voltaic battery used was a lithium ion battery pack similar to that used in an electric or hybrid automobile. The material composition of the battery enclosure was the same as for the example thermal composite described above in example 1. The thermal composite was positioned between the voltaic battery and the test pan.

The test pan included gasoline with water injected at the bottom of the pan. The test pan was ignited and allowed to preheat for 60 seconds. A grate was placed on the test pan. The example battery pack was suspended 50 cm over the flames for 70 seconds. The example battery pack was removed from over the test pan and observed for 2 hours. The battery pack did not suffer any explosion phenomenon. The flame self-extinguished within two minutes after the removal from over the test pan.

The exposed battery pack passed the test requirements and was functional after the tests. The pack diagnostics were able to function and measure the battery packs health status.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 60 volts DC to about 1,500 volts DC should be interpreted to include not only the explicitly recited limits of from about 60 volts DC to about 1,500 volts DC, but also to include individual values, such as 70 volts DC, 300 volts DC, 750 volts DC, 980 volts DC, etc., and sub-ranges, such as from about 65 volts DC to about 910 volts DC, from about 80 volts DC to about 612 volts DC, from about 100 volts DC to about 715 volts DC, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A thermal composite, comprising:
   a substrate having a surface configured to face an internal space to be protected by the thermal composite;
   a primer layer comprising an epoxide;
   a first adhesive layer;
   a blanket layer, the blanket layer including basalt fibers or glass fibers;
   a second adhesive layer; and
   a metal foil layer having an outer surface configured to reflect heat,
   wherein:
   the primer layer is disposed between the substrate and the first adhesive layer;
   the first adhesive layer is disposed between the primer layer and the blanket layer;
   the blanket layer is disposed between the first adhesive layer and the second adhesive layer; and
   the second adhesive layer is disposed between the blanket layer and the metal foil layer.

2. The thermal composite as defined in claim 1, wherein the substrate is a polyester/vinyl ester blend.

3. The thermal composite as defined in claim 1, wherein the primer layer further comprises electromagnetic interference shielding platelets.

4. The thermal composite as defined in claim 1, wherein at least one of the first adhesive layer or the second adhesive layer includes an acrylic adhesive doped with flame retardants.

5. The thermal composite as defined in claim 1, wherein the blanket layer includes a woven sheet, a non-crimped fabric, unidirectionally stitched fibers, a needle-point fiber mat, or a combination thereof formed from the basalt fibers or the glass fibers.

6. The thermal composite as defined in claim 1, wherein the metal foil layer includes aluminum foil.

7. The thermal composite as defined in claim 1, wherein the metal layer includes a metal foil laminated to a cloth.

8. The thermal composite as defined in claim 1, wherein the thermal composite is capable of self-extinguishing an external flame within 2 minutes of fire source removal.

9. The thermal composite as defined in claim 1, wherein the primer layer further comprises electromagnetic interference shielding nickel platelets dispersed within the epoxide.

10. The thermal composite as defined in claim 1, wherein the thermal composite is attached to a base tray, and wherein the thermal composite and the attached base tray together form an enclosure around a battery.

11. A battery pack comprising an enclosure comprising the thermal composite according to claim 1 coupled to a base tray, and a battery disposed within the enclosure.

12. A battery pack, comprising:
    a voltaic battery; and
    a battery enclosure, the battery enclosure including a substrate having a surface configured to face an internal space to be protected by the thermal composite, a primer layer comprising an epoxide, a first adhesive layer, a blanket layer including basalt fibers or glass fibers, a second adhesive layer, and a metal foil layer having an outer surface configured to reflect heat;
    wherein:
    the primer layer is disposed between the substrate and the first adhesive layer;
    the first adhesive layer is disposed between the primer layer and the blanket layer;
    the blanket layer is disposed between the first adhesive layer and the second adhesive layer; and
    the second adhesive layer is disposed between the blanket layer and the metal foil layer.

13. The battery pack as defined in claim 12, wherein the battery enclosure partially encapsulates the voltaic battery, wherein the battery pack further comprises a base tray attached to the battery enclosure, and wherein the battery enclosure and the base tray fully encapsulate the battery pack.

14. The battery pack as defined in claim 13, wherein:
    the substrate is disposed between the voltaic battery and the primer layer.

15. The battery pack as defined in claim 12, wherein the battery enclosure is capable of self-extinguishing an external flame within 2 minutes of fire source removal.

16. The battery pack as defined in claim 12, wherein the substrate is a polyester/vinyl ester blend, and the primer layer further comprises electromagnetic interference shielding platelets.

17. The battery pack as defined in claim 12, wherein at least one of the first adhesive layer or the second adhesive layer includes an acrylic adhesive doped with flame retardants.

18. The battery pack as defined in claim 12, wherein the blanket layer includes a woven sheet, a non-crimped fabric, unidirectionally stitched fibers, a needle-point fiber mat, or a combination thereof, formed from the basalt fibers or the glass fibers.

19. The battery pack as defined in claim 12, wherein the metal layer is aluminum foil.

20. The battery pack as defined in claim 12, wherein the metal layer includes a metal foil laminated to a cloth.

\* \* \* \* \*